US008680820B2

(12) United States Patent
Harrison

(10) Patent No.: US 8,680,820 B2
(45) Date of Patent: Mar. 25, 2014

(54) PFC BOOSTER CIRCUIT

(75) Inventor: Michael John Harrison, Petaluma, CA (US)

(73) Assignee: Eaton Industries Company, Christchurh (NZ)

( * ) Notice: Subject to any disclaimer, the term of this patent is extended or adjusted under 35 U.S.C. 154(b) by 0 days.

(21) Appl. No.: 13/259,873

(22) PCT Filed: Feb. 17, 2010

(86) PCT No.: PCT/NZ2010/000026
§ 371 (c)(1),
(2), (4) Date: Nov. 22, 2011

(87) PCT Pub. No.: WO2010/123381
PCT Pub. Date: Oct. 28, 2010

(65) Prior Publication Data
US 2012/0092913 A1    Apr. 19, 2012

(30) Foreign Application Priority Data

Apr. 20, 2009   (NZ) ........................................ 576387

(51) Int. Cl.
*G05F 5/00*   (2006.01)
*H02M 7/217*  (2006.01)

(52) U.S. Cl.
USPC ........................................ 323/207; 363/127

(58) Field of Classification Search
USPC ......... 323/205, 207, 217, 220, 222, 223, 232, 323/267, 300; 363/63, 81, 84, 89, 125, 127
See application file for complete search history.

(56) References Cited

U.S. PATENT DOCUMENTS 4,395,675 A * 7/1983 Toumani ...................... 323/271

5,532,917 A * 7/1996 Hung ............................. 363/67

(Continued)

OTHER PUBLICATIONS

Huber et al.; *Performance Evaluation of Bridgeless PFC Boost Rectifiers*; IEEE Transactions on Power Electronics, vol. 23, No. 3, (May 2008) pp. 1381-1390.

(Continued)

*Primary Examiner* — Gary L Laxton
*Assistant Examiner* — Alex Torres-Rivera
(74) *Attorney, Agent, or Firm* — Myers Bigel Sibley & Sajovec, P.A.

(57) ABSTRACT

A power factor correction booster circuit for connection to an alternating current (AC) power source including a first circuit portion arranged to be active over a first AC half cycle of the power source, the first circuit portion including: a first AC input node in connection with a source node of a first power transistor, a first node of an inductive element in connection with a drain node of the first power transistor, a second node of the inductive element in connection with a drain node of a second power transistor, a second AC input node in connection with a source node of the second power transistor, an anode of a first semiconductor diode element in connection with the second node of the inductive element, a cathode of the first semiconductor diode element in connection with a first node of a first output capacitor element, and a second node of the first output capacitor element in connection with the second AC input node, wherein the first and second power transistors are controllable to switch the first circuit portion between a forward mode and a flyback mode, such that in the forward mode the inductive element stores energy from the AC power source, and in the flyback mode the stored energy from the inductive element is transferred to the first output capacitor through the first semiconductor diode element.

9 Claims, 3 Drawing Sheets

(56) References Cited

U.S. PATENT DOCUMENTS

| | | | | |
|---|---|---|---|---|
| 5,736,842 | A * | 4/1998 | Jovanovic | 323/222 |
| 6,429,604 | B1 * | 8/2002 | Chang | 315/244 |
| 6,525,513 | B1 * | 2/2003 | Zhao | 323/222 |
| 7,304,457 | B1 | 12/2007 | Huang | |
| 7,605,570 | B2 * | 10/2009 | Liu et al. | 363/89 |
| 7,994,759 | B2 * | 8/2011 | Huang et al. | 323/267 |
| 8,009,448 | B2 * | 8/2011 | Liu | 363/56.12 |
| 2006/0007717 | A1 * | 1/2006 | Lindemann et al. | 363/125 |
| 2006/0267561 | A1 * | 11/2006 | Domb et al. | 323/222 |
| 2007/0069581 | A1 * | 3/2007 | Mino | 307/12 |
| 2008/0068366 | A1 * | 3/2008 | Kim et al. | 345/211 |
| 2008/0122420 | A1 * | 5/2008 | Zhou | 323/285 |
| 2008/0246696 | A1 * | 10/2008 | Yang | 345/68 |
| 2009/0039711 | A1 * | 2/2009 | Williams | 323/271 |
| 2011/0148370 | A1 * | 6/2011 | Mizutani et al. | 323/271 |

OTHER PUBLICATIONS

International Search Report, application No. PCT/NZ2010/000026; Jan. 17, 2011.
Written Opinion of the International Searching Authority, application No. PCT/NZ2010/000026; Jan. 17, 2011.
International Preliminary Report on Patentability Corresponding to International Application No. PCT/NZ2010/000026; Date of Mailing: Nov. 3, 2011; 5 pages.

* cited by examiner

PFC BOOSTER CIRCUIT

RELATED APPLICATIONS

The present application is a 35 U.S.C. §371 national phase application of PCT International Application No. PCT/NZ2010/000026, having an international filing date of Feb. 17, 2010, claiming priority to New Zealand Patent Application No. 576387, filed Apr. 20, 2009. The disclosures of each application are incorporated herein by reference in their entireties. The above PCT International Application was published in the English language and has International Publication No. WO 2010/123381.

FIELD OF THE INVENTION

The present invention relates to a PFC (Power Factor Correction) booster circuit. In particular, the present invention relates to a PFC booster circuit that includes switchable power transistors to switch the circuit between a flyback and forward state.

BACKGROUND

A number of different circuit arrangements for PFC (Power Factor Correction) booster circuits have been contemplated by industry over the years in order to attempt to maximise power supply efficiency whilst reducing the number of components and minimising power losses.

A traditional manner of arranging a single phase PFC booster circuit relied upon a bridge rectifier device to rectify the AC mains supply into a continually changing DC voltage source.

For example, as discussed in the paper "Performance Evaluation of bridgeless PFC Boost Rectifiers" by Huber et al, IEEE TRANSACTIONS ON POWER ELECTRONICS, 2008, VOL 23; Issue 3, pages 1381-1390, conventional PFC booster circuits include full wave rectifiers consisting of four diode elements. An inductive element is provided in series, while a capacitive element is provided in parallel across the output of the rectifier output. A switchable power transistor is controlled to store energy in the inductive element and transfer that stored energy to the capacitive element.

A problem associated with such arrangements is the typical approximate 1V forward voltage drop across the full wave rectifier diodes, which significantly reduces the efficiency of the circuit. That is, during one half cycle of the AC mains supply, a voltage drop occurs across two diodes resulting in an approximate 1% energy loss for high line mains voltage operations and 2% energy loss for low line mains voltage operations.

Bridgeless PFC booster circuits have been developed in an attempt to reduce losses across the diodes of the rectifier section of the circuit. However, the various circuits developed have notable limitations, such as the high amount of switching noise presented to the mains supply, or the need to include two separate boost inductors.

An object of the present invention is to provide a PFC booster circuit that includes switchable power transistors to switch the circuit between a flyback and forward state to store energy in, and release energy from, an inductor element for storage in a capacitor element.

A further object of the present invention is to provide a PFC booster circuit arranged to minimise voltage drops across system components to increase energy efficiency.

A further object of the present invention is to provide a PFC booster circuit with a single inductive element.

Each object is to be read disjunctively with the object of at least providing the public with a useful choice.

The present invention aims to overcome, or at least alleviate, some or all of the afore-mentioned problems.

SUMMARY OF THE INVENTION

The present invention includes a PFC booster circuit that operates in a flyback and forward state. When in the forward state, an inductor is charged from an AC power supply through the control of two power transistors, where a first power transistor is reverse biased and a second power transistor is switched on. When in the flyback state, the second power transistor is switched off and the stored energy in the inductor is transferred via a diode element to a capacitor element.

According to one aspect, the present invention provides a power factor correction booster circuit for connection to an alternating current (AC) power source including a first circuit portion arranged to be active over a first AC half cycle of the power source, the first circuit portion including: a first AC input node in connection with a source node of a first power transistor, a first node of an inductive element in connection with a drain node of the first power transistor, a second node of the inductive element in connection with a drain node of a second power transistor, a second AC input node in connection with a source node of the second power transistor, an anode of a first semiconductor diode element in connection with the second node of the inductive element, a cathode of the first semiconductor diode element in connection with a first node of a first output capacitor element, and a second node of the first output capacitor element in connection with the second AC input node, wherein the first and second power transistors are controllable to switch the first circuit portion between a forward mode and a flyback mode, such that in the forward mode the inductive element stores energy from the AC power source, and in the flyback mode the stored energy from the inductive element is transferred to the first output capacitor through the first semiconductor diode element.

According to a further aspect, the present invention provides a power factor correction booster circuit for connection to an alternating current (AC) power source including a first circuit portion arranged to operate over a first AC half cycle of the power source, the first circuit portion arranged to operate in one of a forward mode and a flyback mode by controlling first and second power transistors, wherein the current path in the forward mode passes through a body diode of the first power transistor to an inductor, and passes from the inductor through a drain node to a source node of the second power transistor, and the current path in the flyback mode passes through the body diode of the first power transistor to the inductor, and from the inductor to a first semiconductor diode element to charge a first output capacitor element.

According to particular embodiments of the present invention the circuit provides efficient power transfer from the AC mains to the output by reducing the loss of voltage dropped across diode components. Further, the number of components used to realize the circuit is minimised.

BRIEF DESCRIPTION OF THE DRAWINGS

Embodiments of the present invention will now be described, by way of example only, with reference to the accompanying drawings, in which.

DETAILED DESCRIPTION OF THE INVENTION

First Embodiment

Figure 1:
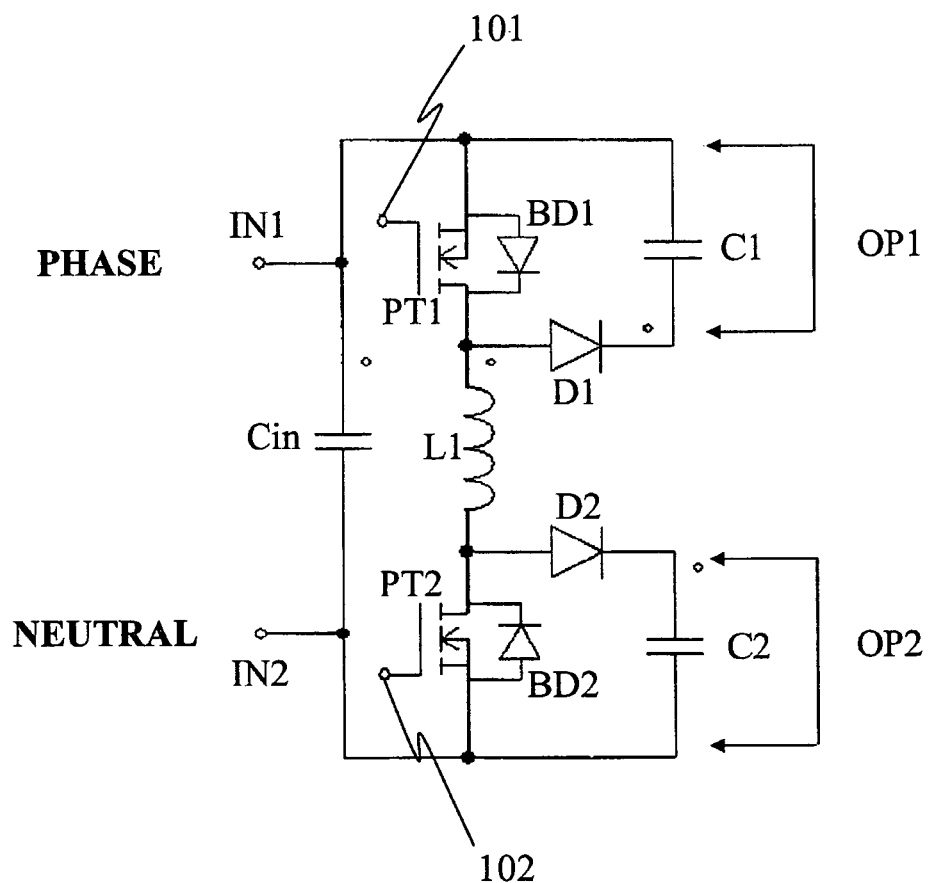
FIG. 1 shows a circuit diagram of a PFC booster circuit according to an embodiment of the present invention.

FIG. 1 shows a circuit diagram of a PFC booster circuit suitable for a switched mode power supply. Two input nodes, IN1 and IN2, are provided to receive the AC mains input signal. IN1 is arranged to receive the phase voltage signal, and IN2 is arranged to receive the neutral voltage signal. A capacitor Cin is provided across the two input nodes.

The circuit consists of two sections separated by a single inductive element L1, which is a boost inductor. The upper section is connected to the phase voltage node. IN1, and the lower section is connected to the neutral voltage node IN2.

In the upper section of this embodiment, a first power transistor PT1 is a Metal Oxide Field Effect Transistor (MOSFET). The MOSFET PT1 has its source node connected to the phase voltage node IN1, and a first node of a first output capacitor C1. The drain node of PT1 is connected to an anode of a first diode D1, and a first node of the inductive element L1. The gate node 101 of PT1 is connected to a power transistor control circuit, which is arranged to control the switching on and off of the power transistors. The cathode of the first diode D1 is connected to a second node of the first output capacitor C1.

In the lower section of this embodiment, a second power transistor PT2 is also a Metal Oxide Field Effect Transistor (MOSFET). The MOSFET PT2 has its source node connected to the neutral voltage node IN2, and a first node of a second output capacitor C2. The drain node of PT2 is connected to an anode of a second diode D2 and a second node of the inductive element L1. The gate node 102 of PT2 is connected to the power transistor control circuit, which is arranged to control the switching on and off of the power transistors. The cathode of the second diode D2 is connected to a second node of the second output capacitor C2.

The output of the upper section OP1 is taken across the first output capacitor C1. The output of the lower section OP2 is taken across the second output capacitor C2.

Figure 2:
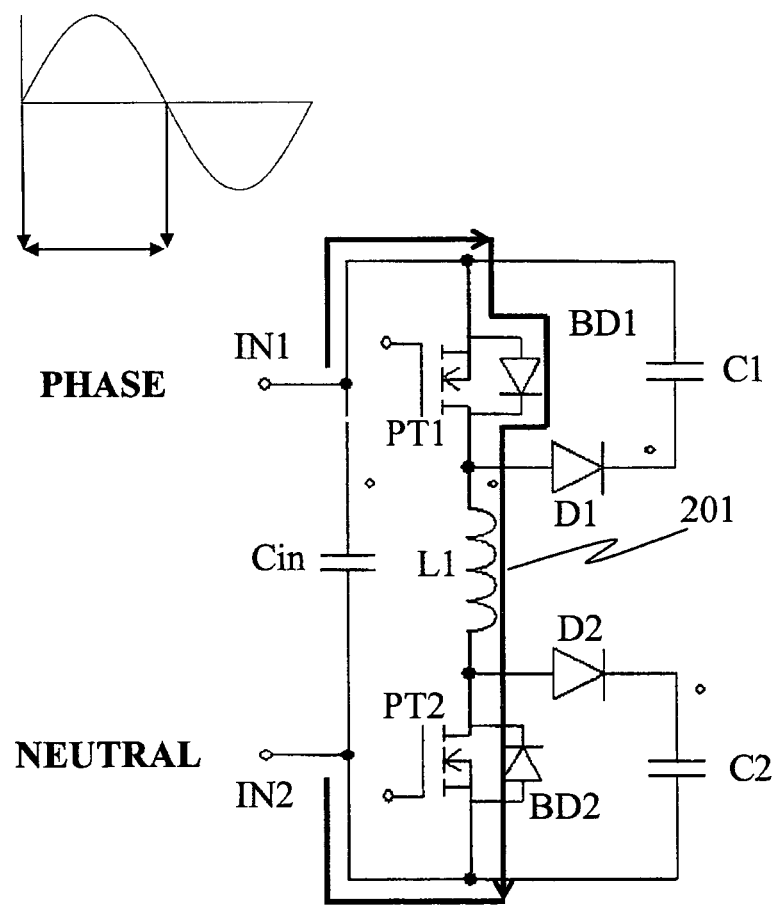
FIG. 2 shows the circuit of FIG. 1 operating in a forward state according to an embodiment of the present invention.
Figure 3:
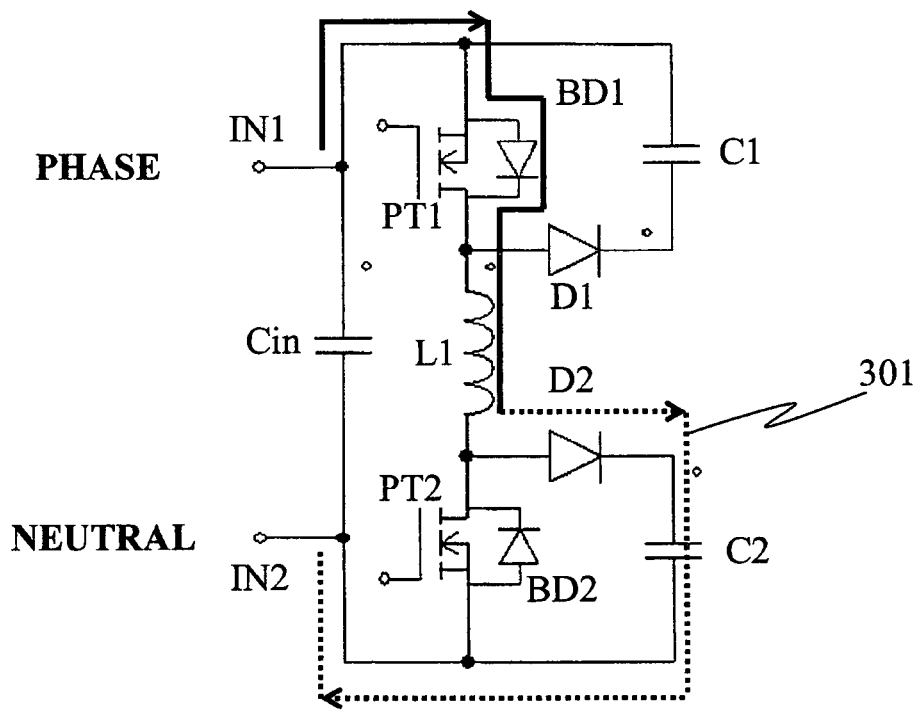
FIG. 3 shows the circuit of FIG. 1 operating in a flyback state according to an embodiment of the present invention.

Both power transistors, PT1 & PT2, have inherent body diodes, BD1 & BD2, formed therein as shown in FIGS. 1 to 3.

The PFC circuit is controlled so that it operates in either a forward state/mode or flyback state/mode. During the forward state, power transistor PT2 is switched ON and power transistor PT1 is switched OFF by signals received from the power transistor control circuit. During the flyback state, power transistor PT1 is switched ON and power transistor PT2 is switched OFF by the control circuit signals.

The control of the power transistors in this PFC booster circuit is provided by an electrically isolated gate driver control circuit (i.e. isolated from the upper and lower sections of the circuit). Any suitable control circuit known to the skilled person may be used as the gate driver circuit, such as any conventional PFC booster control circuit with the addition of any suitable monitoring means that monitors the bi-polar circuit voltage, current and polarity to control how the PFC booster circuit power transistors are controlled. Further, the control circuit includes separate gate voltage drive means to generate separate gate drive voltages for the power transistors. Operation of the first and second power transistors is controlled based on the monitored signals.

The control of the power transistors may be based on continuous current mode (CCM), discontinuous current mode (DCM) or boundary current mode (BCM) for the inductor current. Further, the control may employ fixed or variable frequency switching, derived from an average current mode control scheme or a "single cycle" type control algorithm. It will be understood that any suitable existing PFC booster control scheme may be applied to control the herein described circuit operation.

The circuit in FIG. 2 is shown to be operating in a first half cycle of the AC mains input when the phase voltage input is more positive than the neutral voltage input. During this first half cycle, power transistor PT1 is reverse biased and a current path is provided though its body diode BD1 to the boost inductor L1.

When operating this circuit in the forward state, the current 201 flows from input node IN1, through the body diode BD1 of power transistor PT1 and through the switched on power transistor PT2 to input node IN2. This effectively connects the boost inductor L1 across the AC voltage source and so energy from the AC voltage source is stored in the boost inductor L1. Further, only a single diode BD1 is effectively positioned within the circuit during this operation, and so effectively only a single relevant voltage drop exists (across BD1) during the forward state of operation.

Referring to FIG. 3, the circuit is shown to be operating in the flyback state during the same first half cycle of the AC mains input as shown in FIG. 2. In this state however, the current that was passing through the power transistor PT2 now flows through the second diode D2 and into the second output capacitor C2 due to power transistor PT2 being switched off. This effectively transfers the stored energy within the boost inductor L1 to the second output capacitor C2.

The circuit as described works in a similar manner during the second half cycle of the AC mains input when the phase voltage is more negative than the neutral voltage. During the second half cycle, when the circuit, is in the forward state, current flows through body diode BD2 of power transistor PT2, through the boost inductor L1 and through power transistor PT1, which has, been switched on by the control circuit due to monitoring of the AC mains input. This effectively places the boost inductor L1 across the mains supply as described above, but in the opposite polarity.

When switching the circuit to operate in a flyback state, PT1 is switched off by the control circuitry and the current that was flowing through PT1 now flows through diode D1 into output capacitor C1.

Output power is drawn equally from the output capacitors C1 and C2 to provide a consolidated output using any known suitable circuitry.

Therefore, the circuit as described provides a number of advantages over prior known circuits as follows. The herein described embodiment is only required to have a single inductive boost element, thus reducing the number of inductive components and saving costs. Further, the reverse biased power transistors may be driven in a controlled manner to achieve synchronous rectification of the AC source signal. In addition, the bridgeless PFC booster circuit is highly efficient due to the reduction of voltage drops when the circuit is operating. The increase in efficiency also results in the circuit generating less heat and so making it easier to cool the circuitry as well as reducing operational electricity costs. Also, the boost inductor provides an impedance path to any AC source transient conditions.

Second Embodiment

It will be understood that although the above described first embodiment includes MOSFET devices for the power transistor, the use of other suitable alternative power transistor devices may be employed. For example, in this embodiment, the power transistor is an insulated gate bipolar transistor (IGBT) device rather than a MOSFET device.

Therefore, any reference to the drain nodes and source nodes of the MOSFET power transistor in the description of the above first embodiment and in the claims is considered to be equivalent to the collector nodes and emitter nodes of the IGBT power transistor arrangement for this embodiment.

Further, the collector-emitter junction of the IGBT device in this embodiment includes an "anti-parallel" diode connected across the junction to provide a reverse current path in a similar manner as provided by the "body diode" in the MOSFET arrangement described in the above first embodiment.

Therefore, any reference to a body diode of the MOSFET arrangement described in the above first embodiment and in the claims is considered to be the equivalent of an anti-parallel diode in the IGBT arrangement.

The circuit as described in the above first embodiment is the same as the circuit of this embodiment apart from the replacement of the MOSFET transistors with the IGBT devices, and it will be understood that the circuit will be controlled and so will operate in the same manner as described in the above first embodiment.

FURTHER EMBODIMENTS

It will be understood that the embodiments of the present invention described herein are by way of example only, and that various changes and modifications may be made without departing from the scope of invention.

It will be understood that any inductive element described as being a single inductive element may consist of multiple inductive elements arranged in series that effectively act and operate as a single inductive element.

The invention claimed is:

1. A power factor correction booster circuit comprising:
a first AC input node for connection to an AC power source;
a second AC input node for connection to the AC power source;
a first power transistor having a first node in connection with the first AC input node;
an inductor having a first node in connection with a second node of the first power transistor;
a second power transistor having a first node in connection with a second node of the inductor and a second node in connection with the second AC input node;
a first semiconductor diode having an anode in connection with the second node of the inductor;
a first output capacitor having a first node in connection with a cathode of the first semiconductor diode and a second node in connection with the second AC input node; and
a control circuit that controls the first and second power transistors such that, in a first forward mode, the second power transistor conducts current to store energy from the AC power source in the inductor and, in a first flyback mode, the second power transistor blocks current to transfer the stored energy from the inductor to the first output capacitor through the first semiconductor diode.

2. The power factor correction booster circuit of claim 1 further comprising:
a second semiconductor diode having an anode in connection with the first node of the inductor;
a second output capacitor having a first node in connection with a cathode of the second semiconductor diode and a second node in connection with the first AC input node, wherein the control circuit controls the first and second power transistors such that, in a second forward mode, the first power transistor conducts current to store energy from the AC power source in the inductor and, in a second flyback mode, the first power transistor blocks current to cause transfer of the stored energy from the inductor to the second output capacitor through the second semiconductor diode element.

3. The power factor correction booster circuit of claim 1 wherein the inductor comprises a single inductor.

4. The power factor correction booster circuit of claim 1 wherein the first and second power transistors are metal oxide field effect transistors or insulated gate bipolar transistors.

5. The power factor correction booster circuit of claim 1 wherein the control circuit is configured to monitor a voltage, a current and a polarity of the AC power source coupled to the first and second AC input nodes and to control the first and second power transistors based on the monitored voltage, current and polarity.

6. The power factor correction booster circuit of claim 5, wherein the control circuit includes a gate driver circuit that drives gate nodes of the first and second power transistors.

7. The power factor correction booster circuit of claim 6 wherein the gate driver circuit generates separate gate drive signals for the first and second power transistors.

8. The power factor correction booster circuit of claim 6 wherein the gate driver circuit is electrically isolated.

9. The power factor correction booster circuit of claim 6 wherein the driver circuit drives the gate nodes of the first and second power transistors using one of a continuous mode, a discontinuous mode and a boundary current mode.

* * * * *

UNITED STATES PATENT AND TRADEMARK OFFICE
CERTIFICATE OF CORRECTION

PATENT NO. : 8,680,820 B2
APPLICATION NO. : 13/259873
DATED : March 25, 2014
INVENTOR(S) : Harrison Page 1 of 1

It is certified that error appears in the above-identified patent and that said Letters Patent is hereby corrected as shown below:

On Title Page:
Item (73), Assignee:
Please replace "Eaton Industries Company, Christchurh (NZ)"
to read -- Eaton Industries Company, Christchurch (NZ) --

Signed and Sealed this
Twenty-first Day of October, 2014

Michelle K. Lee
*Deputy Director of the United States Patent and Trademark Office*